United States Patent
Ikeda et al.

(10) Patent No.: US 9,083,042 B2
(45) Date of Patent: Jul. 14, 2015

(54) NEGATIVE ELECTRODE ACTIVE MATERIAL, ELECTRODE CONTAINING THE SAME, AND LITHIUM ION SECONDARY BATTERY HAVING THE ELECTRODE

(71) Applicant: TDK Corporation, Tokyo (JP)

(72) Inventors: Yasuhiro Ikeda, Tokyo (JP); Atsushi Sano, Tokyo (JP); Masaki Sobu, Tokyo (JP); Tetsuo Takaishi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 5 days.

(21) Appl. No.: 13/845,836

(22) Filed: Mar. 18, 2013

(65) Prior Publication Data

US 2013/0256591 A1    Oct. 3, 2013

(30) Foreign Application Priority Data

Mar. 27, 2012 (JP) ................................. 2012-070948
Mar. 13, 2013 (JP) ................................. 2013-050346

(51) Int. Cl.
*H01M 4/48* (2010.01)

(52) U.S. Cl.
CPC ........................................ *H01M 4/48* (2013.01)

(58) Field of Classification Search
CPC .......................................................... H01M 4/48
USPC ........................................................ 252/182.1
See application file for complete search history.

(56) References Cited

U.S. PATENT DOCUMENTS

2002/0182343 A1    12/2002   Yuda et al.
2010/0243951 A1*   9/2010    Watanabe et al. .......... 252/182.1

FOREIGN PATENT DOCUMENTS

JP    A-2001-015101    1/2001
JP    A-2004-055505    2/2004

* cited by examiner

*Primary Examiner* — Peter F Godenschwager
(74) *Attorney, Agent, or Firm* — Oliff PLC

(57) ABSTRACT

A negative electrode active material mainly contains silicon and silicon oxide. In the negative electrode active material, an Ar-laser Raman spectrum thereof includes a peak A corresponding to $950\pm30$ $cm^{-1}$ and a peak B corresponding to $480\pm30$ $cm^{-1}$, and an intensity ratio of the peak B to the peak A (B/A) is in the range of 1 to 10.

7 Claims, 2 Drawing Sheets

NEGATIVE ELECTRODE ACTIVE MATERIAL, ELECTRODE CONTAINING THE SAME, AND LITHIUM ION SECONDARY BATTERY HAVING THE ELECTRODE

BACKGROUND

1. Technical Field

The present disclosure relates to a negative electrode active material, an electrode containing the negative electrode active material, and a lithium ion secondary battery having the electrode.

2. Related Art

Lithium ion secondary batteries are lighter in weight and higher in capacity than nickel-cadmium batteries, nickel-metal hydride batteries, and the like. The lithium ion secondary battery has been therefore widely used as a power source for a mobile electronic appliance. Further, as the mobile electronic appliances decrease in size and increase in functionality in recent years, the lithium ion secondary battery has been expected to have further higher capacity. Not just for the mobile electronic appliances, furthermore, the high-capacity lithium ion secondary battery has been a strong candidate as a power source to be mounted on a hybrid vehicle, an electric vehicle, or the like.

The capacity of the lithium ion secondary battery mainly depends on an active material of an electrode. In general, for example, a negative electrode active material contains graphite. However, for meeting the above demand, a negative electrode active material with higher capacity has been desired. Therefore, silicon has attracted attention as a material for the negative electrode active material. Silicon has much higher theoretical capacity (4210 mAh/g) than the theoretical capacity (372 mAh/g) of graphite.

In a negative electrode active material including a mixture of silicon and silicon oxide, the stress caused by expansion and shrinkage of silicon during charging and discharging is relaxed by silicon oxide. The mixture is therefore considered to have superior cycle characteristics to silicon. However, the mixture of silicon and silicon oxide has poor electric conductivity. As a result, when the current density during discharging is high relative to the battery capacity, the use of this mixture as the negative electrode active material causes a significant decrease in discharge capacity. On the other hand, the power source for a hybrid vehicle and an electric vehicle is desired to have high discharge capacity at high rate. Therefore, the use of this mixture as the material of the negative electrode active material of such a power source has a problem.

JP-A-2001-15101 and JP-A-2004-55505 suggest techniques of covering silicon and silicon oxide with carbon in order to increase the discharge capacity at high rate. However, in the techniques disclosed in these documents, a surface of the negative electrode active material is mostly covered with carbon, so that the contact area between the negative electrode active material and an electrolyte solution becomes small. Hence, these techniques fail to increase the discharge capacity at high rate sufficiently.

SUMMARY

A negative electrode active material mainly contains silicon and silicon oxide. In the negative electrode active material, an Ar-laser Raman spectrum thereof includes a peak A corresponding to $950\pm30\ cm^{-1}$ and a peak B corresponding to $480\pm30\ cm^{-1}$, and an intensity ratio of the peak B to the peak A (B/A) is in the range of 1 to 10.

DETAILED DESCRIPTION

Figure 1:
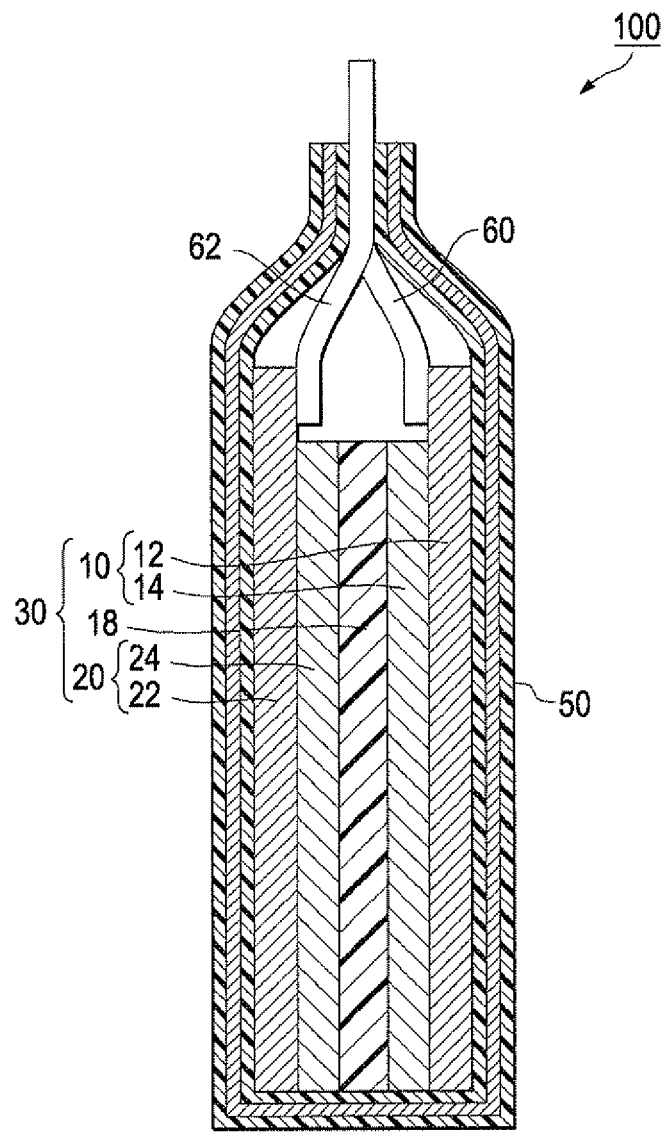
FIG. 1 is a schematic cross-sectional view of a lithium ion secondary battery according to an embodiment of the present disclosure.
Figure 2:
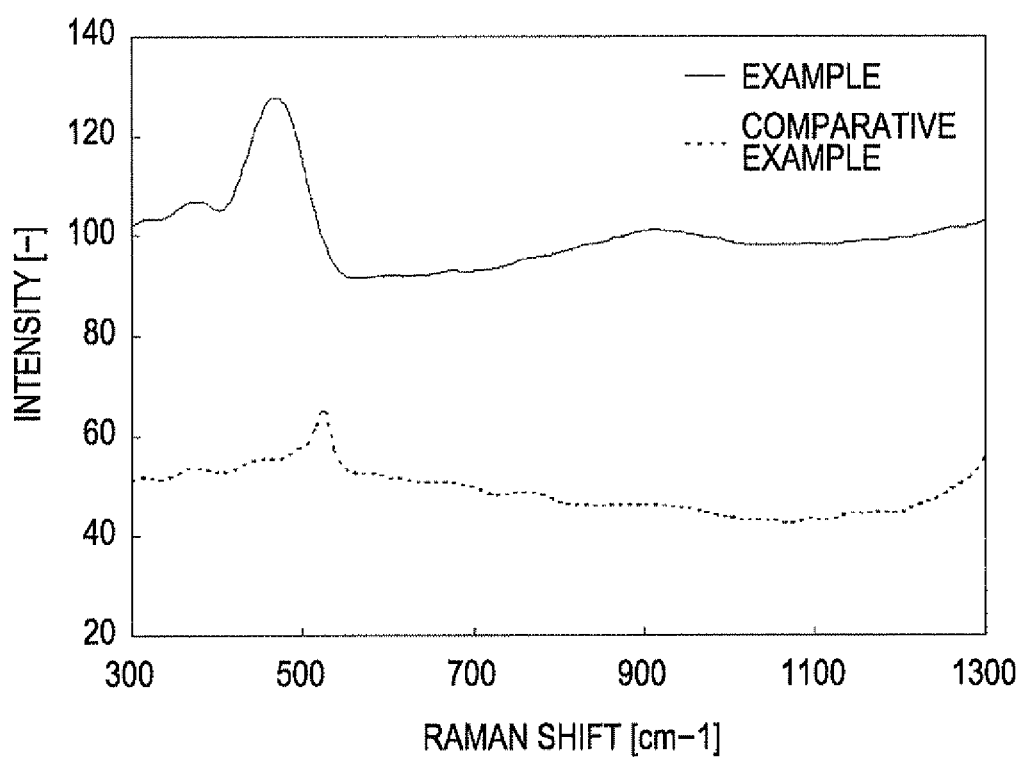
FIG. 2 is a Raman spectrum of a negative electrode active material according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to provide a negative electrode active material with sufficiently high capacity even at high rate, an electrode containing the negative electrode active material, and a lithium ion secondary battery having the electrode.

A negative electrode active material according to the present disclosure (present negative electrode active material) mainly contains silicon and silicon oxide. An Ar-laser Raman spectrum of the present negative electrode active material includes a peak A corresponding to $950\pm30\ cm^{-1}$ and a peak B corresponding to $480\pm30\ cm^{-1}$ and the intensity ratio of the peak B to the peak A (B/A) is in the range of 1 to 10.

The present negative electrode active material having such a structure can maintain high strength and suppress excessive cross-linking between silicon and oxygen in the negative electrode active material. Moreover, the present negative electrode active material can have sufficient diffusion paths for lithium and sufficiently high discharge capacity at high rate.

A negative electrode according to the present disclosure contains the present negative electrode active material. Therefore, this negative electrode can have sufficiently high discharge capacity at high rate.

A lithium ion secondary battery according to the present disclosure has the aforementioned negative electrode. Thus, this secondary battery can have sufficiently high discharge capacity at high rate.

According to the present disclosure, the negative electrode active material having sufficiently high discharge capacity at high rate, the electrode containing the negative electrode active material, and the lithium ion secondary battery having the electrode can be provided.

A preferred embodiment of the present disclosure is hereinafter described with reference to drawings. Note that the present disclosure is not limited to the following embodiment. Moreover, the components described below include components that can be easily conceived by those skilled in the art and components that are substantially the same as those components. Furthermore, the components described below can be combined with one another as appropriate.

As depicted in FIG. 1, a lithium ion secondary battery 100 mainly includes a laminate 30, a case 50, a pair of leads 60 and 62 connected to the laminate 30, and an electrolyte solution containing lithium ions. The case 50 houses the laminate 30 and the electrolyte solution in a sealed state.

The laminate 30 includes a positive electrode 10, a negative electrode 20 facing the positive electrode 10, and a separator 18. The separator 18 is held between the positive electrode 10 and the negative electrode 20 in contact with a main plane of the positive electrode 10 and a main plane of the negative electrode 20.

The positive electrode 10 includes a positive electrode current collector 12, and a positive electrode active material layer 14 formed on the positive electrode current collector 12. The negative electrode 20 includes a negative electrode current collector 22, and a negative electrode active material layer 24 formed on the negative electrode current collector 22. The separator 18 is disposed between the negative electrode active material layer 24 and the positive electrode active material layer 14.

The positive electrode active material layer 14 contains at least a positive electrode active material and a conductive auxiliary agent. Any material can be used as the positive electrode active material as long as the material can intercalate and deintercalate lithium ions, perform intercalation and deintercalation of lithium ions, or perform reversible doping and de-doping of lithium ions and counter anions of the lithium ions (for example, $PF_6^-$). The positive electrode active material of the positive electrode active material layer 14 includes a known electrode active material.

The positive electrode active material contains, for example, lithium cobaltate ($LiCoO_2$), lithium nickelate ($LiNiO_2$), or lithium manganese spinel ($LiMn_2O_4$). Alternatively, the positive electrode active material contains, for example, a composite metal oxide. The composite metal oxide contained in the positive electrode active material is represented by, for example, the general formula: $LiNi_xCo_yMn_zM_aO_2$ (x+y+z+a=1, 0≤x≤1, 0≤y≤1, 0≤z≤1, and 0≤a≤1, where M represents one or more elements selected from Al, Mg, Nb, Ti, Cu, Zn, and Cr). Alternatively, furthermore, the positive electrode active material contains, for example, a lithium vanadium compound ($LiV_2O_5$), Olivine type $LiMPO_4$ (where M represents one or more elements selected from Co, Ni, Mn, Fe, Mg, Nb, Ti, Al, and Zr, or VO), or lithium titanate ($Li_4Ti_5O_{12}$).

The conductive auxiliary agent contains, for example, a carbon material such as carbon blacks, a powder of metal such as copper, nickel, stainless steel, or iron, a mixture of the carbon material and the powder of metal, or a conductive oxide such as ITO. The carbon material preferably contains carbon with a tap density of 0.03 to 0.09 g/ml and carbon with a tap density of 0.1 to 0.3 g/ml. The positive electrode active material layer 14 may contain a binder that binds the active material and the conductive auxiliary agent. The positive electrode active material layer 14 is formed through a step of applying a coating to the positive electrode current collector 12. Here, the coating includes the positive electrode active material, the binder, a solvent, the conductive auxiliary agent, and the like.

The negative electrode active material layer 24 contains at least a negative electrode active material and a conductive auxiliary agent. In a manner similar to the positive electrode active material layer 14, the negative electrode active material layer 24 is formed through a step of applying a coating including the negative electrode active material and the like to the negative electrode current collector 22.

The negative electrode active material according to this embodiment (present negative electrode active material) mainly contains silicon and silicon oxide. As silicon oxide, for example, silicon monoxide (SiO), silicon dioxide ($SiO_2$), or the like can be used. The negative electrode active material may contain one kind of silicon oxide, or two or more kinds of silicon oxides.

In this specification, the negative electrode active material mainly containing silicon and silicon oxide means a negative electrode active material in which the sum (mass ratio) of the mass of silicon and the mass of silicon oxide is 90 mass % or more with respect to the total mass of the negative electrode active material. From the viewpoint of achieving higher theoretical capacity, the mass ratio is preferably 95 mass % or more and more preferably 100 mass %.

The Ar-laser Raman spectrum of the mixture of silicon and silicon oxide in the present negative electrode active material includes the peak A corresponding to a wave number of 950±30 $cm^{-1}$ and the peak B corresponding to a wave number of 480±30 $cm^{-1}$. The peak B represents amorphous silicon, which does not change depending on the bonding state with oxygen. The intensity ratio of the peak B to the peak A (B/A) of the present negative electrode active material is in the range of 1 to 10. Furthermore, the spectrum preferably includes at least one of a peak C corresponding to a wave number of 1050±30 $cm^{-1}$, a peak D corresponding to a wave number of 1100±30 $cm^{-1}$, and a peak E corresponding to a wave number of 1170±30 $cm^{-1}$.

The peaks A, C, D, and E correspond to the bonding between silicon and oxygen cross-linking with silicon (respectively corresponding to SiO, $SiO_2$, $SiO_3$, and $SiO_4$). In the present negative electrode active material, silicon and oxygen cross-linking with silicon are bonded. This allows the present negative electrode active material to have high strength. Thus, in the electrode containing the present negative electrode active material, electric disconnection of a part of the negative electrode active material due to the expansion and shrinkage during charging and discharging can be suppressed and the reduction of the amount of the negative electrode active material in an active state can be suppressed.

The ratio B/A is preferably in the range of 1 to 10, and more preferably from 3.5 to 5.9. When the ratio B/A is less than 1, the rate characteristic tends to deteriorate. Also when the ratio B/A is more than 10, the rate characteristic tends to deteriorate.

By controlling the ratio B/A, the strength of the negative electrode active material can be maintained, and excessive cross-linking between silicon and oxygen in the negative electrode active material can be suppressed. Therefore, the lithium ion secondary battery having sufficient diffusion paths for lithium and sufficiently high discharge capacity at high rate can be provided.

In the present negative electrode active material, it is preferred that the peak A have the highest intensity among the peaks A, C, D, and E in the Ar-laser Raman spectrum.

The peak A represents bonding between silicon and one oxygen atom cross-linking with silicon. The peak E represents bonding between silicon and the largest number of oxygen atoms cross-linking with silicon. In other words, the peak E represents bonding between silicon and oxygen atoms forming a tetrahedron. When the active material has a number of structures having a large number of bonds between silicon and oxygen, the diffusion of lithium ions is suppressed. On the other hand, the strength of the active material is low as long as any structure having a number of cross-linked states between silicon and oxygen, which is represented by any of the peaks C, D, and E, is not present at all.

Even when a plurality of peaks in the Ar-laser Raman spectrum are overlapped with one another, the peak corresponding to a predetermined vibration mode can be specified.

This specification is performed by, for example, performing peak separation with the pseudo-voigt function.

A preferred manufacturing method for the present negative electrode active material includes sintering a mixture of silicon and silicon oxide under an oxygen pressure of 5 atm to 15 atm at 300° C. to 500° C., crushing the sintered mixture with a ball mill, and sintering the crushed mixture again under the above conditions.

For allowing the present negative electrode active material to have a desired peak in the Ar-laser Raman spectrum, the production conditions such as the crushing condition of the mixture of silicon and silicon oxide and the heat treatment condition are adjusted as appropriate.

Thus, the amount of bonding between silicon and oxygen can be controlled as appropriate. As a result, the present negative electrode active material having sufficiently high discharge capacity even at high rate can be produced.

The separator 18 may have an electrically insulating porous structure. The material of the separator 18 includes, for example, a single-layer body or a laminate including a film of polyethylene, polypropylene, or polyolefin, an extended film of a mixture including any of the above resins, and a fiber nonwoven fabric including at least one constituent selected from the group consisting of cellulose, polyester, and polypropylene.

The electrolyte solution may be, for example, a nonaqueous solvent (organic solvent) in which a lithium salt is dissolved. Examples of the lithium salt include $LiPF_6$, $LiClO_4$, $LiBF_4$, $LiAsF_6$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. Any of these salts may be used alone or in combination of two or more kinds thereof.

Examples of the preferable organic solvent include propylene carbonate, ethylene carbonate, diethyl carbonate, dimethyl carbonate, and methyl ethyl carbonate. Any of these may be used alone or in combination of two or more kinds thereof in arbitrary proportion. The organic solvent preferably includes a mixture of cyclic carbonate and chain carbonate. The organic solvent particularly preferably contains at least ethylene carbonate and diethyl carbonate from the viewpoint of the balance between discharge capacity and a cycle characteristic.

EXAMPLES

Hereinafter, the present invention is described more specifically with reference to examples and comparative examples. However, the present invention is not limited to the examples below.

Example 1

A negative electrode active material according to Example 1 was produced according to the following procedure: Si and SiO were mixed at a ratio of Si/SiO=1/2 (weight ratio). Then, this mixture was crushed and mixed by a planetary ball mill, the crushed mixture was sintered under an oxygen pressure of 10 atm at 400° C., the sintered mixture was crushed again using a planetary ball mill, and the crushed mixture was sintered again under the above conditions. In the crushing and mixing, alumina beads of 3 mm in diameter were used as media of the planetary ball mill, the number of rotations of the planetary ball mill was set to 450 rmp, and the crushing and mixing time was set to 60 minutes. Consequently, the present negative electrode active material was obtained.

A slurry for the negative electrode active material layer was prepared by mixing 83 parts by mass of the negative electrode active material, 2 parts by mass of acetylene black, 15 parts by mass of polyamide-imide, and 82 parts by mass of N-methylpyrrolidone. This slurry was applied to the surface of a 14-μm-thick copper foil so that the amount of coating of the negative electrode active material was 2.0 mg/cm², and then dried at 100° C. to give a negative electrode active material layer. Subsequently, the negative electrode (the copper foil to which the slurry had been applied) was press-formed by roller pressing, and heat treatment was performed thereon in vacuum at 350° C. for three hours to give the negative electrode in which the negative electrode active material layer had a thickness of 18 μm. A laminate was formed. The laminate includes the negative electrode according to Example 1 manufactured as described above, a counter electrode (positive electrode) including a copper foil with a lithium metal foil attached thereto, and the separator including the polyethylene porous film held between the electrodes was formed. This laminate was placed in an aluminum laminated package. Then, a $LiPF_6$ solution (solvent: ethylene carbonate/diethyl carbonate=3/7 (volume ratio)) of a 1 M (1 mol/L) in concentration was injected as the electrolyte solution into this aluminum laminated package. Subsequently, the package was sealed under vacuum. Consequently, a lithium ion secondary battery according to Example 1 for evaluation was obtained.

Examples 2 to 13

Negative electrode active materials according to Examples 2 to 13 were obtained in a manner similar to Example 1 except that the number of rotations of the planetary ball mill during crush of the sintered mixture was set to those shown in Table 1 below. Moreover, negative electrodes and lithium ion secondary batteries for evaluation according to Examples 2 to 13 were produced in a manner similar to Example 1 using the obtained negative electrode active materials.

Comparative Example 1

A negative electrode and a lithium ion secondary battery for evaluation according to Comparative Example 1 were produced in a manner similar to Example I except that the ball mill treatment and the heat treatment were not performed.

Comparative Example 2

A negative electrode and a lithium ion secondary battery for evaluation according to Comparative Example 2 were produced in a manner similar to Example 1 except that the number of rotations of the ball mill was set to 1000 rpm.

The high-rate characteristic of the lithium ion secondary batteries for evaluation according to the examples and comparative examples was evaluated. In this evaluation, a secondary battery charging/discharging testing device was used. Each secondary battery was charged and discharged with the voltage ranging from 0.005 V to 2.5 V at discharge rates (current values) of 1 C and 5 C. Note that 1 C=1600 mAh/g. Thus, the discharge capacity (discharge capacity retention) at 5 C relative to the discharge capacity at 1 C was measured. The results are shown in Table 1.

<How to Calculate B/A>

With an Ar-laser Raman device manufactured by Horiba Jobin Yvon, the Raman spectrum of each negative electrode active material was measured. An Ar-ion laser with a wavelength of 514.532 nm was used as a laser source. The peak separation was performed on the obtained Raman spectrum with the pseudo-voigt function. Based on the intensity of the peak A at 950 cm$^{-1}$ and the intensity of the peak B at 480 cm$^{-1}$, the intensity ratio of the peak B to the peak A (B/A) was calculated.

TABLE 1

|  | number of rotations of ball mill (rpm) | oxygen pressure (atm) | sintering temperature (° C.) | B/A | discharge retention (%) |
|---|---|---|---|---|---|
| Example 1 | 450 | 10 | 400 | 10.0 | 70 |
| Example 2 | 500 | 10 | 400 | 7.3 | 72 |
| Example 3 | 550 | 10 | 400 | 5.9 | 76 |
| Example 4 | 600 | 10 | 400 | 5.0 | 78 |
| Example 5 | 650 | 10 | 400 | 4.2 | 77 |
| Example 6 | 700 | 10 | 400 | 3.5 | 76 |
| Example 7 | 750 | 10 | 400 | 2.1 | 71 |
| Example 8 | 800 | 10 | 400 | 1.3 | 70 |
| Example 9 | 850 | 10 | 400 | 1.0 | 69 |
| Example 10 | 500 | 5 | 400 | 7.5 | 71 |
| Example 11 | 500 | 15 | 400 | 4.6 | 77 |
| Example 12 | 500 | 10 | 300 | 7.8 | 71 |
| Example 13 | 500 | 10 | 500 | 4.2 | 77 |
| Comparative Example 1 | — | — | — | 11.0 | 55 |
| Comparative Example 2 | 1000 | 10 | 400 | 0.6 | 54 |

As Table 1 indicates, Examples 1 to 13 provided excellent high-rate characteristics but Comparative Examples 1 and 2 failed to provide sufficient high-rate characteristics.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A negative electrode active material mainly comprising silicon and silicon oxide, wherein:
    when measured with an Ar-ion laser with a wavelength of 514.532 nm as a laser source, an Ar-laser Raman spectrum of the negative electrode active material includes a peak A corresponding to 950 ±30 cm$^{-1}$ and a peak B corresponding to 480 ±30 cm$^{-1}$; and
    an intensity ratio of the peak B to the peak A (B/A) is in the range of 1 to 10.

2. The negative electrode active material according to claim 1, wherein a ratio of a sum of the mass of silicon and the mass of silicon oxide to a total mass of the negative electrode active material is 95 mass% or more.

3. The negative electrode active material according to claim 1, wherein the Ar-laser Raman spectrum includes at least one of a peak C corresponding to 1050 ±30 cm$^{-1}$, a peak D corresponding to 1100 ±30 cm$^{-1}$, and a peak E corresponding to 1170 ±30 cm$^{-1}$.

4. The negative electrode active material according to claim 3, wherein the peak A has the highest intensity among the peaks A to E.

5. The negative electrode active material according to claim 1, wherein the ratio B/A is in the range of 3.5 to 5.9.

6. A negative electrode comprising a negative electrode active material according to claim 1.

7. A lithium ion secondary battery comprising an electrode according to claim 6.

\* \* \* \* \*